United States Patent [19]

Thomas

[11] 4,112,786
[45] Sep. 12, 1978

[54] BOLTLESS HOUSING FOR GEAR HEADS AND THE LIKE

[75] Inventor: Richard J. Thomas, Wallingford, Conn.

[73] Assignee: Robbins & Myers, Inc., Springfield, Ohio

[21] Appl. No.: 760,814

[22] Filed: Jan. 19, 1977

[51] Int. Cl.² .................. F16H 57/02; F16H 1/16; B21D 53/28; F16C 1/06
[52] U.S. Cl. .................. 74/606 R; 29/159.2; 64/3; 74/425
[58] Field of Search ............ 74/606, 425; 64/3; 29/159.2; 228/135

[56] References Cited

U.S. PATENT DOCUMENTS

| 1,749,077 | 3/1930 | Kennedy | 74/606 R |
| 3,964,335 | 6/1976 | Gérard | 74/425 |
| 4,020,715 | 5/1977 | Sollars | 74/606 R |

*Primary Examiner*—Leonard H. Gerin
*Attorney, Agent, or Firm*—Melville, Strasser, Foster & Hoffman

[57] ABSTRACT

There is disclosed a housing assembly for gear heads or speed reducers and the like, and a method of assembly of such devices, which eliminates all drilling, tapping, fasteners, shims, gaskets and sealants, as well as doing away with assembly skill, which has been required heretofore to set proper bearing clearance. It is applicable to the assembly of any rotating element, such as a worm wheel, into a housing. The housing may have a bore for the introduction of the rotating element on one side only. The bore is closed by a side plate which fits into the housing with a small clearance and is sealed with an ordinary O-ring. After the rotating element and its bearings have been inserted into the housing and side plate, the side plate is pressed into the bore until zero axial clearance is attained. The bore in the housing has an annular groove, and by the use of a circular die which has an annular chamfer or rabbet opposed to the annular groove, and which has a suitable sprue and vent holes, molten zinc is introduced through the sprue to form an annular key to hold the parts in assembly. By virtue of the annular chamfer, the zinc key is exposed so that it can be removed by machine or melting, if it should become necessary to gain access to the interior of the housing, as for example to replace the bearings. The parts can then be reassembled in the same way as before.

4 Claims, 3 Drawing Figures

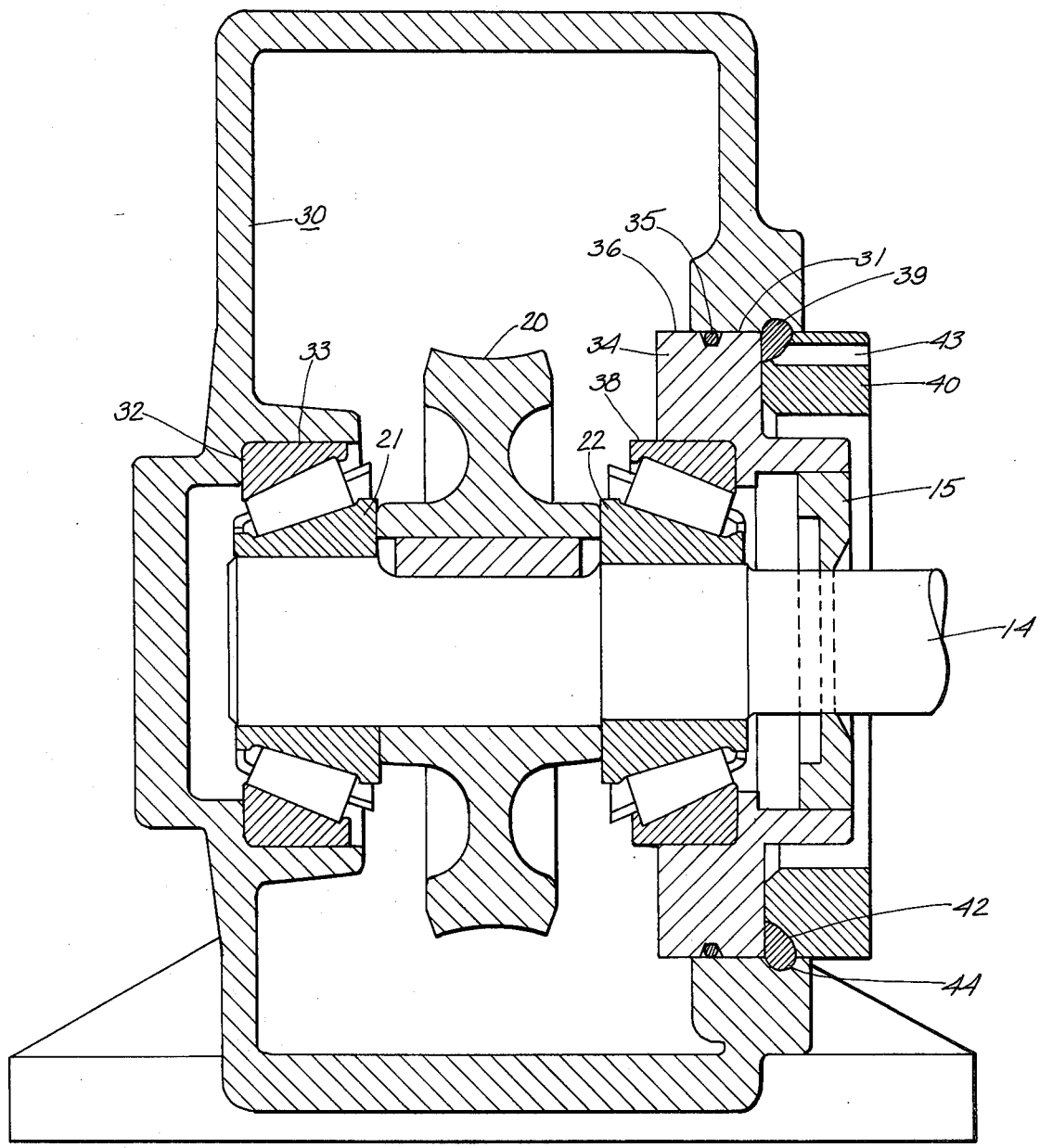
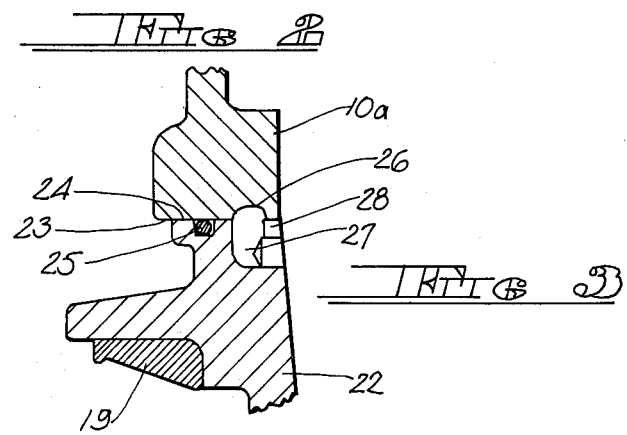

BOLTLESS HOUSING FOR GEAR HEADS AND THE LIKE

BRIEF SUMMARY OF THE INVENTION

The invention relates to the assembly of a rotatable element having a shaft into a housing provided with bearings for the shaft, and sealing the assembly. An example of such a structure is a worm gear speed reducer. In conventional practice, the housing has been provided with two circular openings in axial alignment. The worm gear and bearing cones mounted on the shaft are introduced through one of the circular openings and the openings are then closed by means of circular side plates which carry the bearing cups for the worm gear shaft. Shims, and/or gaskets, must be inserted between the side plates and the housing in order to center the worm gear in the housing to obtain a proper contact pattern between the worm and worm gear, and to obtain the proper axial clearance of the bearings. At the operating speeds of the worm gear shaft the proper bearing clearance is essentially zero.

In the assembly operation, a number of shims are inserted on both sides of the housing. When the parts are assembled and the side plates are bolted in place, contact between the worm and worm gear is checked. If improper contact is obtained, the side plates must be removed and the shimming changed, and the parts then reassembled. To achieve proper alignment of the worm gear axially and to obtain the correct bearing clearance often requires a number of disassembly and reassembly operations, and these are of course time consuming, and require skilled assemblers, and therefore increase the cost of the gear reducer.

It has been proposed, in the case of small units, to provide only one side plate. By accurate machining of the shoulder which receives the axial thrust from the low speed bearing on the integral side, axial positioning of the worm gear can be achieved. It is still necessary, however, to provide shims and gaskets under the separate side plate to obtain the proper bearing operating clearance, and to seal the opening against leakage. This constructions thus eliminates half of the shimming and adjusting.

More recently it has been proposed to eliminate one side plate as above described, and to eliminate all drilling, tapping, fasteners, shims, gaskets and sealants, and all assembly skill heretofore required properly to align the worm gear and to set the bearing clearances. Here a straight bore was provided in the housing, and the side plate was a sliding fit in the said bore, and a conventional O-ring was used to seal against leakage between the housing and the side plate. The side plate was located in the housing bore by the set-up of the output shaft bearings, and was pressed into the housing until the bearings had a zero axial clearance. This is the correct setting for this type of speed reducer. Radial location of the side plate was achieved by the small clearance between the outside diameter of the side plate and the housing bore mentioned above.

The side plate was provided with a small hole or sprue communicating with an annular external groove in the side plate and a cooperating annular internal groove in the bore. One or more vent holes were provided in the side plate communicating with said grooves. When the side plate was properly positioned as above outlined, white metal, i.e. molten zinc, was introduced into the sprue hole, so that it flowed around and filled the cooperating grooves in the side plate and bore. The zinc flows very quickly and thus forms a key, locking the parts together in correct relationship.

The main objection to this proposal was that once the assembly was locked, it could not be disassembled for repair or replacement of worn parts. Thus, it was a "throwaway" device and only suitable for very small and inexpensive reducers.

The present invention takes advantage of the last above described improvement, but it provides a zinc key which can be removed by machining, melting or chipping out, so that worn parts can be replaced and the unit can then be reassembled and relocked by means of molten zinc.

According to this invention, the bore is again provided with an internal annular groove. An annular die is provided which fits snugly into the housing bore. The die has an outer annular chamfer or rabbet arranged to cooperate with the internal annular groove in the bore. The die has a small hole or sprue connecting with the annular chamfer or rabbet, and also with one or more vent holes communicating with the chamfer or rabbet. Molten zinc is introduced into the hole in the die and fills the annular groove and cooperating chamfer or rabbet to provide a locking key. When the die is removed, the portion of the key formed by the chamfer or rabbet is exposed. When it is desired to replace a bearing or the worm gear, the key can easily be removed by machining, chipping or melting, whereupon the side plate may be removed. After the necessary repair or replacement, the side plate may again be locked in place by use of the die.

Thus, even large and expensive speed reducers may be manufactured using the molten zinc to form a locking key.

BRIEF DESCRIPTION OF THE SEVERAL FIGURES OF THE DRAWINGS

FIG. 2 is a fragmentary view showing another heretofore proposed arrangement.

FIG. 3 is a cross sectional view showing the present invention.

DETAILED DESCRIPTION

Figure 1:
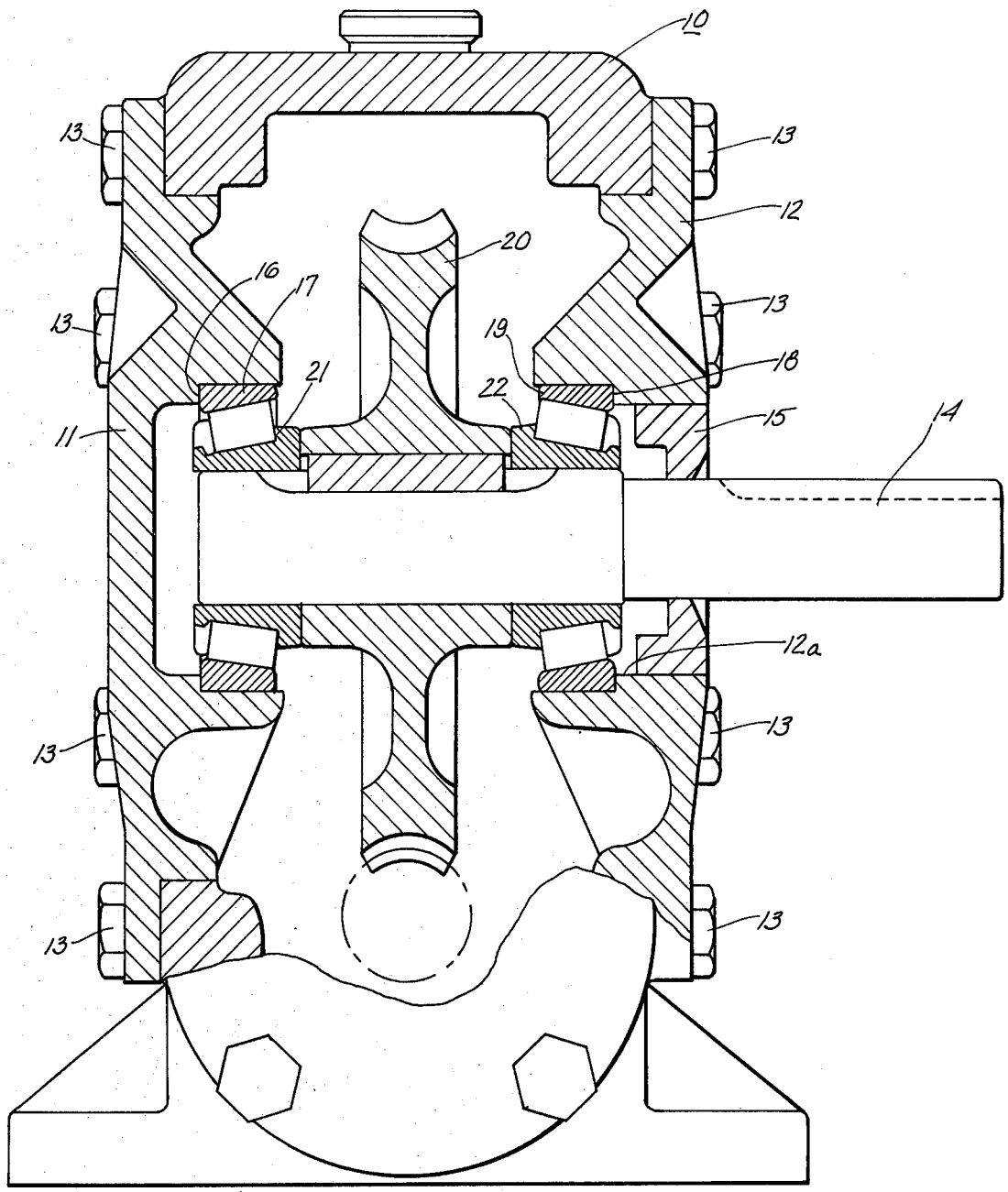
FIG. 1 is a cross sectional view through a gear reducer showing the prior art construction.

In FIG. 1 a typical prior art construction is shown. The housing for the gear reducer is indicated generally at 10 and is provided with the side plates 11 and 12 which are bolted in place by means of the bolts 13. The particular construction shown in FIG. 1 is one wherein the worm gear shaft 14 extends from one side only of the gear reducer. In other words, the side plate 11 is solid or unperforated, while the side plate 12 has the hole 12a for the passage of the shaft 14. The hole 12a is closed with a conventional seal generally indicated at 15.

The side plate 11 has the machine shoulder 16 against which the bearing cup 17 seats and similarly the side plate 12 has the shoulder 18 against which the bearing cup 19 seats. It will be understood that gaskets and/or shims are inserted between the respective side plates 11 and 12 and the housing 10.

The shaft 14 of course carries the worm gear 20 and the bearing cones 21 and 22.

In assembling this structure, the bearing cup 17 is pressed into the side plate 11 against the shoulder 16 and the shaft 14 carrying the bearing cones 21 and 22 and the worm gear 20 is inserted. The side plate 12 carrying the bearing cup 19 is pressed against the shoulder 18 and the assembly bolted down.

The alignment of the gear 20 is checked as well as the bearing clearance. If these parameters are not correct, the entire unit is disassembled, the shimming between the side plates 11 and 12 respectively and the housing 10 is changed in order to properly center the worm gear 20 and to provide the proper bearing clearance. When everything is properly set and aligned, the unit is again bolted down and the seal 15 is emplaced.

An improvement described above is shown in a fragmentary cross sectional view in FIG. 2. Here again the housing 10a may have only a single opening on one side for the shaft or it may have an opening axially aligned therewith on the other side if the shaft is to project from both sides of the housing.

It will be seen that here the housing 10a has a bore 23 and that the side plate 22 has a smooth cylindrical surface 24 which fits smoothly into the bore 23. The surfaces 23 and 24 are sealed by means of a conventional O-ring 25.

It will be observed that the housing 10a in the surface 23 has the annular groove 26 and that the side plate 22 has the annular external groove 27. A suitable opening or sprue is provided at 28 through which a white metal such as zinc may be introduced. It will be clear that the cooperating grooves 26 and 27 will be filled with the zinc which freezes rapidly and forms a key locking the side plate 22 into position in the bore 23 of the housing 10a.

It will also be observed that the key in the grooves 26 and 27 will not be accessible and therefore if it is necessary to replace a bearing or the worm gear, this cannot be done and the entire unit has to be discarded.

The present invention is illustrated in FIG. 2, which is a view similar to FIG. 1. Here the housing generally indicated at 30 may be entirely closed on the one side and have only the cylindrical bore 31 on the other side through which the worm gear shaft and bearing cone assembly may be introduced. Again, a shoulder 32 is provided to seat the bearing cup 33. The side plate 34 is provided with the O-ring 35 to seal the cylindrical surface 36 of the side plate 34 against the surface 31 of the bore. The side plate 34 also has a seat 37 for the bearing cup 38. Again, an annular internal groove 39 is provided in the bore 31.

In assembling this device, the shaft 14 carrying the bearing cones 21 and 22 and the worm gear 20 is inserted through the bore 31 and then the side plate 34 carrying the bearing cup 38 is slid into the bore 31 and pressed in until the bearing clearance is zero, which is correct for this type of unit.

With the parts in this assembled condition, a die 40 is inserted into the bore 31. This die is an annular die which provides an annular chamfer 42 adapted to cooperate with the groove 39. A suitable sprue hole or the like is provided at 43 and of course vent holes will be provided as is well known to permit escape of air as the zinc is introduced through the sprue 43.

It will be clear that the molten zinc which freezes rapidly forms a key 44 which extends into the groove 39 and the chamfer 42. When the die 40 is removed, it will be seen that a portion of the key 44 which overlaps the side plate 34 will be exposed, so that if it is desired to gain access to the interior of the unit, the key 44 may be machined out, chipped out, or melted out, and the side plate 34 may then be removed and the necessary repairs accomplished. Thereafter, the parts may be reassembled as above outlined and relocked by means of a new molten zinc key. A conventional seal 15 will be applied to protect the bearing 22 as is conventional.

It will be clear that a unit manufactured and assembled according to the present invention will have the correct bearing clearance and the correct axial position of the gear without requiring any operator skill and without requiring repeated assembly checking and dismantling and reassembling as has been necessary in the past.

Numerous other advantages are achieved by the present invention. The conventional drilled and tapped holes in the housing for bolting the side plates to the housing will generally leak lubricant out of the housing, and therefore it is generally thought to be necessary to blind drill and tap holes. This is a difficult operation. The conventional gaskets, shims and sealants used are good but not perfect in preventing slow seepage of lubricant from the inside to the outside of the housing. Furthermore, the housing is "cleaner" in design because there are no protruding bolt heads and lock washers and thus the construction is more attractive, particularly in industries handling foodstuffs which require that the equipment be free of pockets and ledges which can collect dust, dirt and food particles. It should be noted that the zinc key is not relied upon for oil sealing. This function is performed by the O-ring. It is also significant that there is no need for surface preparation of the housing base metal since the invention does not in any way depend on adhesion of the zinc to the housing. The zinc provides a purely mechanical key.

When reference has been made to a sprue hole in the die, it should be understood that the sprue hole may be provided in the housing. With the sprue hole in the housing, the injected metal ring is prevented from rotation. Furthermore, removal of the die becomes easier since it would not require breaking the sprue.

While the construction has been described in connection with a gear reducer, it will be understood that it may be adapted for numerous other uses such as the assembly of rotors in electric motors and the like. For these reasons, no limitation other than as set forth in the claims which follow is intended and no such limitation should be implied.

The embodiments of the invention in which an exclusive property or privilege is claimed are defined as follows:

1. A housing containing a shaft-mounted rotatable element, said housing having one integral side carrying a shaft bearing, said housing having a circular bore on the other side, through which said shaft bearing may be emplaced, and through which said shaft and rotatable member may be inserted into said housing, a circular side plate for said housing carrying a second shaft bearing, said side plate fitting in said bore with very small clearance, an O-ring between said bore and side plate for sealing purposes, an internal annular groove in said bore, and an annular key filling said annular groove and having an annular portion exposed on the outside of said side plate, said key locking said side plate in position and being removable by machining, melting and the like for repair.

2. A housing for a gear reducer containing a shaft mounted worm gear, said housing having one integral side carrying a shaft bearing, said housing having a circular bore on the other side, through which said shaft bearing may be emplaced, and through which said shaft and worm gear may be inserted into said housing, a circular side plate for said housing carrying a second shaft bearing, said side plate fitting in said bore with very small clearance, an O-ring between said bore and said side plate for sealing purposes, an internal annular groove in said bore, and an annular key filling said annular groove and having an annular portion exposed on the outside of said side plate, said key locking said side plate in position and being removable by machining, melting and the like for repair.

3. The method of assembling a shaft-mounted rotatable member into a housing having one integral side carrying a shaft bearing, having a circular bore on its other side, and having a circular side plate fitting in said bore with very small clearance, and having an internal annular groove in said bore, said side plate carrying a second shaft bearing; which includes the steps of providing an annular die fitting snugly in said bore, said die having an external annular chamfer, providing a sprue hole and at least one vent hole communicating with said chamfer, inserting said shaft mounted rotatable member and bearing into said housing, inserting said side plate into said bore and pressing it in until the proper bearing clearance is achieved, then sliding said die into position, introducing molten zinc into said sprue hole to form an annular key filling said groove and chamfer, and after solidification of said molten zinc, removing said die.

4. The method of assembling a shaft-mounted worm gear into a speed reducer housing having one integral side carrying a shaft bearing, having a circular bore on its other side, and having a circular side plate fitting in said bore with very small clearance, and having an internal annular groove in said bore, said side plate carrying a second shaft bearing, which includes the steps of providing an annular die fitting snugly in said bore, said die having an external annular chamfer, providing a sprue hole and at least one vent hole communicating with said chamfer, inserting said shaft mounted worm gear and bearings into said housing, inserting said side plate into said bore and pressing it in until the proper bearing clearance is achieved, then sliding said die into position, introducing molten zinc into said sprue to form an annular key filling said groove and chamfer, and after solidification of said molten zinc, removing said die.

* * * * *